US012750196B2

(12) United States Patent
Li et al.

(10) Patent No.: US 12,750,196 B2
(45) Date of Patent: Sep. 29, 2026

(54) TECHNOLOGIES FOR BANDWIDTH PART SWITCHING

(71) Applicant: Apple Inc., Cupertino, CA (US)

(72) Inventors: Qiming Li, Beijing (CN); Xiang Chen, Campbell, CA (US); Yang Tang, San Jose, CA (US); Dawei Zhang, Saratoga, CA (US); Yuexia Song, Beijing (CN); Jie Cui, San Jose, CA (US)

(73) Assignee: Apple Inc., Cupertino, CA (US)

( * ) Notice: Subject to any disclaimer, the term of this patent is extended or adjusted under 35 U.S.C. 154(b) by 173 days.

(21) Appl. No.: 18/757,493

(22) Filed: Jun. 27, 2024

(65) Prior Publication Data

US 2025/0038936 A1 Jan. 30, 2025

Related U.S. Application Data

(60) Provisional application No. 63/529,283, filed on Jul. 27, 2023.

(51) Int. Cl.
*H04L 5/00* (2006.01)

(52) U.S. Cl.
CPC .......... *H04L 5/0096* (2013.01); *H04L 5/0053* (2013.01); *H04L 5/0094* (2013.01)

(58) Field of Classification Search
CPC ... H04L 5/0096; H04L 5/0053; H04L 5/0094; H04L 5/0098
See application file for complete search history.

(56) References Cited

U.S. PATENT DOCUMENTS 12,355,695 B2 * 7/2025 Siomina .................. H04L 5/001
2008/0198917 A1 * 8/2008 Mignone ............. H04L 25/4906 375/239
2022/0140975 A1 * 5/2022 Siomina .................. H04L 5/001 370/329

OTHER PUBLICATIONS

Technical Specification, entitled 3rd Generation Partnership Project; Technical Specification Group Radio Access Network; NR; Physical layer procedures for data (Release 18); 3GPP TS 38.214 V17.6.0 (Jun. 2023) in 231 pages.
Technical Specification, entitled 3rd Generation Partnership Project; Technical Specification Group Radio Access Network; NR; Physical layer procedures for control (Release 17); 3GPP TS 38.213 V17.6.0 (Jun. 2023) in 262 pages.
Technical Specification, entitled 3rd Generation Partnership Project; Technical Specification Group Radio Access Network; NR; User Equipment (UE) radio access capabilities (Release 17); 3GPP TS 38.306 V17.5.0 (Jun. 2023) in 256 pages.
Part 1 of Part 2: Technical Specification entitled 3rd Generation Partnership Project; Technical Specification Group Radio Access Network; NR; Requirements for support of radio resource management (Release 17); 3GPP TS 38.133 V17.10.0 (Jun. 2023) in 3016 pages—(1-2888 pgs).
Part 2 of Part 2: Technical Specification entitled 3rd Generation Partnership Project; Technical Specification Group Radio Access Network; NR; Requirements for support of radio resource management (Release 17); 3GPP TS 38.133 V17.10.0 (Jun. 2023) in 3016 pages—(2889-5208 pgs).

* cited by examiner

*Primary Examiner* — Richard T Torrente
(74) *Attorney, Agent, or Firm* — Kilpatrick Townsend & Stockton LLP

(57) ABSTRACT

The present application relates to devices and components, including apparatus, systems, and methods for performing bandwidth part (BWP) switching.

20 Claims, 10 Drawing Sheets

400

Table 410

| Index | NR slot length (ms) | BWP switch delay $T_{BWPSwitchDelay}$ (slots) | | |
|---|---|---|---|---|
| | | Type 1[Note 1] | Type 2[Note 2] | Type 3[Note 3] |
| 0 | 1 | 1 | 3 | X1 |
| 1 | 0.5 | 2 | 5 | X2 |
| 2 | 0.25 | 3 | 9 | X3 |
| 3 | 0.125 | 6 | 18 | X4 |
| 5 | 0.03125 | 20 | 65 | X5 |
| 6 | 0.015625 | 39 | 129 | X6 |

Note 1: Depends on UE capability.
Note 2: If the BWP switch involves changing of SCS, the BWP switch delay is determined by the smaller SCS between the SCS before BWP switch and the SCS after BWP switch.
Note 3: This applies when locationAndBandwidth is changed.

BWP configuration 420

```
BWP::=  SEQUENCE {
        locationAndBandwidth      Integer            (0..37949),
        subcarrierSpacing         SubcarrierSpacing,
        cyclicPrefix              Enumerated         {extended}
        }
```

425

FIG. 4

500

Table 510

| Index | NR slot length (ms) | Interruption length (slots) | |
|---|---|---|---|
| | | Y | Z Note 1 |
| 0 | 1 | 1 | Z1 |
| 1 | 0.5 | 1 | Z2 |
| 2 | 0.25 | 3 | Z3 |
| 3 | 0.125 | 5 | Z4 |
| 5 | 0.03125 | 17 | Z5 |
| 6 | 0.015625 | 33 | Z6 |

Note 1: for UE supporting bwp-SwitchingDelay-r19, interruption length Z shall apply instead of Y.

515

UE capability 520

| | Per | M | FDD-TDD DIFF | FR1-FR2 DIFF |
|---|---|---|---|---|
| bwp-SwitchingDelay-r19 | UE | No | No | No |

525

FIG. 5

TECHNOLOGIES FOR BANDWIDTH PART SWITCHING

CROSS-REFERENCES TO OTHER APPLICATIONS

This application claims priority to U.S. Provisional Application No. 63/529,283, for "TECHNOLOGIES FOR BANDWIDTH PART SWITCHING," filed on Jul. 27, 2023, which is herein incorporated by reference in its entirety for all purposes.

TECHNICAL FIELD

This application generally relates to cellular communication networks and, in particular, to technologies for bandwidth part switching.

BACKGROUND

In a cellular wireless communication system, the total bandwidth may be partitioned into subsets known as bandwidth parts (BWPs). Each user, e.g., a user equipment (UE), may be assigned to a BWP. The network may dynamically change the BWP of a user to improve the performance of the user's connection, conserve power, or support different types of traffic.

BRIEF DESCRIPTION OF THE DRAWINGS

FIG. 4 illustrates configuration aspects in accordance with some embodiments.

FIG. 5 illustrates configuration aspects in accordance with some embodiments.

DETAILED DESCRIPTION

Figure 1:
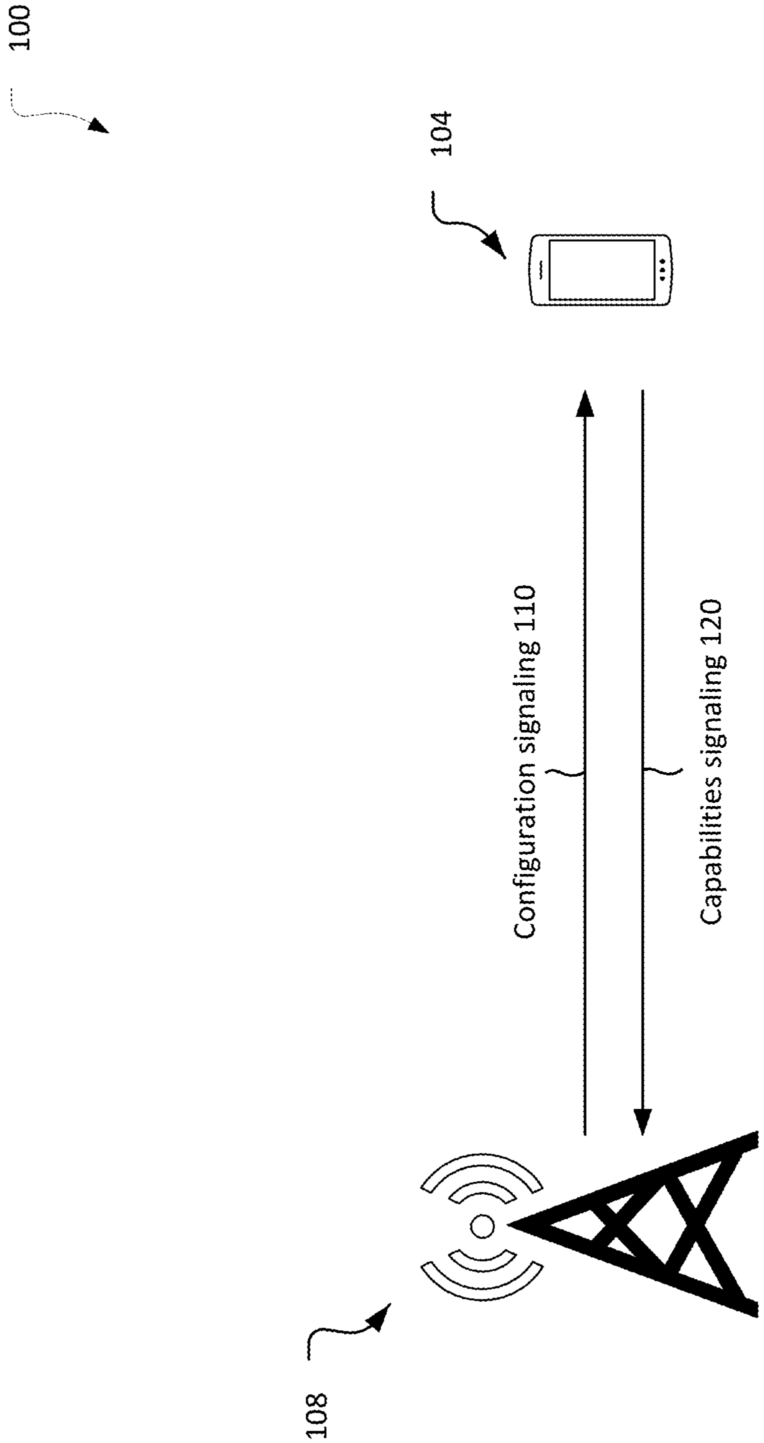
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth, such as particular structures, architectures, interfaces, and/or techniques, in order to provide a thorough understanding of the various aspects of some embodiments. However, it will be apparent to those skilled in the art having the benefit of the present disclosure that the various aspects of the various aspects may be practiced in other examples that depart from these specific details. In certain instances, descriptions of well-known devices, circuits, and methods are omitted so as not to obscure the description of the various aspects with unnecessary detail. For the purposes of the present document, the phrase "A or B" means (A), (B), or (A and B), and the phrase "based on A" means "based at least in part on A," for example, it could be "based solely on A," or it could be "based in part on A."

The following is a glossary of terms that may be used in this disclosure.

The term "circuitry" as used herein refers to, is part of, or includes hardware components, such as an electronic circuit, a logic circuit, a processor (shared, dedicated, or group), or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), and/or digital signal processors (DSPs), that are configured to provide the described functionality. In some aspects, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these aspects, the combination of hardware elements and program code may be referred to as a particular type of circuitry.

The term "processor circuitry" as used herein refers to, is part of, or includes circuitry capable of sequentially and automatically carrying out a sequence of arithmetic or logical operations; or recording, storing, or transferring digital data. The term "processor circuitry" may refer to an application processor; baseband processor; a central processing unit (CPU); a graphics processing unit; a single-core processor; a dual-core processor; a triple-core processor; a quad-core processor; or any other device capable of executing or otherwise operating computer-executable instructions, such as program code; software modules; or functional processes.

The term "interface circuitry," as used herein, refers to, is part of, or includes circuitry that enables the exchange of information between two or more components or devices. The term "interface circuitry" may refer to one or more hardware interfaces; for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device, including a wireless communications interface.

The term "computer system," as used herein, refers to any type of interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to a computer, storage, or network resources provided by physical hardware element(s). A "virtualized resource" may refer to a computer, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services and may include computing or network resources. System resources may be considered as a set of coherent functions, network data objects, or services accessible through a server where such system resources reside on a single host or multiple hosts and are clearly identifiable.

The term "channel," as used herein, refers to any tangible or intangible transmission medium used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link," as used herein, refers to a connection between two devices for the purpose of transmitting and receiving information.

The terms "instantiate," "instantiation," and the like, as used herein, refer to the creation of an instance. An "instance" also refers to a concrete occurrence of an object, which may occur, for example, during the execution of program code.

The term "connected" may mean that two or more elements at a common communication protocol layer have an established signaling relationship with one another over a communication channel, link, interface, or reference point.

The term "network element," as used herein, refers to physical or virtualized equipment or infrastructure used to provide wired or wireless communication network services. The term "network element" may be considered synonymous with or referred to as a networked computer, networking hardware, network equipment, network node, virtualized network function, or the like.

The term "information element" refers to a structural element containing one or more fields. The term "field" refers to individual contents of an information element or a data element that contains content. An information element may include one or more additional information elements.

FIG. 1 illustrates a network environment 100 in accordance with some embodiments. The network environment 100 may include a UE 104 coupled with a base station (BS) 108 of a radio access network (RAN). In some embodiments, the BS 108 is a next-generation node B (gNB) that provides one or more 3GPP New Radio (NR) cells. In other embodiments, the BS 108 is an evolved node B (eNB) that provides one or more Long Term Evolution (LTE) cells. The air interface over which the UE 104 and the BS 108 communicate may be compatible with 3GPP technical specifications (TSs), such as those that define Fifth Generation (5G) NR or later system standards (e.g., Sixth Generation (6G) standards).

The BS 108 may configure the UE 104 through configuration signaling 110. The configuration process may set up the UE 104 to connect to the network, e.g., the BS 108. For example, the BS 108 may configure the UE 104 using radio resource control (RRC) signaling.

The configuration signaling 110 may include information elements. For example, the configuration signaling 110 may include UE's traffic requirements, security settings, quality of service settings, or connection settings. The connection setting may include a BWP configuration. For example, the BWP configuration may indicate a BWP's width, subcarrier spacing used for the BWP, or whether the BWP is used for uplink (UL) or downlink (DL). The BWP configuration may indicate configurations for the physical uplink shared channel (PUSCH), the physical uplink control channel (PUCCH), the physical downlink shared channel (PDSCH), the physical downlink control channel (PDCCH), or random access channel (RACH).

In some embodiments, the BS 108 may configure the UE 104 with multiple BWPs, e.g., 4 candidate BWPs for each serving cell. Different BWPs may cover the same frequencies, e.g., having the same starting and ending frequencies. Different BWPs may cover different frequencies or may overlap with one another on some frequencies. The parameters in BWP configurations may be different. For example, configurations for PDCCH, PDSCH, or other channels of one BWP configuration may be different from another BWP configuration. In some instances, the BS 108 activates one of the configured BWPs known as an active BWP.

The UE 104 may switch the active BWP from one configured BWP to another configured BWP. BWP switching may be triggered by the UE 104 or the BS 108. The BS 108 may control the BWP switching. The UE 104 or the BS 108 may detect a condition or event and trigger the BWP switching. The condition or event may include a change in the UE's location, the radio environment, or the UE's traffic requirements. In some instances, the trigger event may be the expiration of a BWP switch timer or RRC reconfiguration.

The UE 104 may be required to complete the BWP switching within a specific switch delay time. The BS 108 may configure the UE 104 with a BWP switch timer. For example, the BS 108 may use the $T_{BWPswitchDelay}$ parameter (or information element) in the RRC configuration to configure the switch timer at the UE 104.

The UE 104 may send the capabilities signaling 120 to the BS 108 to inform the network of the UE's capabilities. The capabilities signaling 120 may include parameters indicating UE's supported radio bands, supported data rates, supported modulation and coding schemes, supported multiple antenna transmissions and receptions, or supported features. The BS 108 may use the capabilities signaling 120 to configure the UE 104, to allocate network resources, e.g., radio bands or time, frequency, and spatial (multiple antenna schemes) resources, or to optimize the UE's connection. For example, the capabilities signaling 120 may be an RRC signaling, e.g., UE Capability Information.

The BS 108 may configure the BWP for the UE 104 based on the UE's capabilities received in capabilities signaling 120. For example, the BS 108 may determine the $T_{BWPswitchDelay}$ based on the UE's capabilities.

In some instances, the BS 108 may configure the UE 104 with BWP without restriction. BWP without restriction may be a BWP configuration in which the downlink BWP may not include the synchronization signaling, e.g., synchronization signaling block (SSB). The BS 108 may use the RRC signaling flag, bwp-withoutRestriction, to indicate whether the BWP is without restriction.

The UE 104 may use an SSB to perform beam management (BM), radio link management (RLM), or beam failure detection (BFD). The BM, RLM, or BFD operations may include receiving a reference signal, measuring the reference signal (e.g., measuring the received signal strength), detecting the best beam, detecting a condition or failure of the radio link, or detecting a condition of failure of a beam.

When BWP without restriction is configured, the UE 104 may have the following options to perform BM, RLM, or BFD.

In option one, the UE 104 may perform BM, RLM, or BFD based on channel state information (CSI) reference signal (RS) within the active BWP.

In option two, the UE 104 may perform BM, RLM, or BFD based on an SSB outside the active BWP without interruption. The actual BW of the UE 104 may be larger than the configured BW of the BWP. The UE 104 may use the BW outside the BWP to monitor the SSB. The UE 104 may not need to interrupt its transmission to adjust its BW to monitor the SSB.

In option three, the UE 104 may perform BM, RLM, or BFD based on an SSB outside the active BWP with interruption. Each time the UE 104 is scheduled (or configured) to monitor the SSB, the UE 104 has to interrupt its operation, increase the BW to include the SSB and monitor the SSB. Once the BM, RLM, or BFD measurements are performed, the UE 104 may reduce the BW to the configured BWP. Option three may have a smaller power consumption than option two.

In option four, the UE 104 may perform BM, RLM, or BFD on SSB using frequencies outside BWP during measurement gaps. For example, the UE 104 may measure BM, RLM, or BFD during the dedicated measurement gap or network-controlled small gap (NCSG).

In option five, the UE 104 may perform BM, RLM, or BFD using a non-cell-defining (NCD) SSB. The NCD SSB may be allocated frequencies inside the active BWP. In some instances, the NCD-SSB may be allocated frequencies outside the active BWP.

BWP switch delay may refer to the time it takes for the UE 104 to complete the BWP switching process from one BWP configuration to another. During BWP switching, the UE 104 may need to reconfigure its receiver or transmitter parameters, tune to the new set of frequency resources, or adjust its signal processing. This reconfiguration process may take some time to complete, and the duration of this process may be referred to as the BWP switch delay.

When the UE 104 supports BWP without restriction or interruption, the UE 104 may apply an actual BW that is larger than the BW of the configured active BWP. For example, the UE 104 may receive or monitor the entire bandwidth (the actual BW in this example) for SSB and perform UL transmission or DL reception on the configured BWP. Such UE may be capable of fast BWP switching and may tolerate smaller BWP switch delay. In some embodiments, the BS 108 may determine the UE's capability of supporting BWP without restriction and delay, and based on such determination, the BS 108 may send DL transmissions to the UE 104 or not expect to receive an UL transmission from the UE 104 for a time period based on such UE capability.

When the UE 104 switches between different BWPs, there might be an interruption or gap in the data transmission or reception during the switching process. The duration of this interruption is referred to as the interruption length. When the UE 104 supports BWP without restriction or interruption, the UE 104 may tolerate a smaller interruption length. In one embodiment, the BS 108 determines the interruption of the UE 104 based on the UE's capability to support BWP without restriction or interruption.

Figure 2:
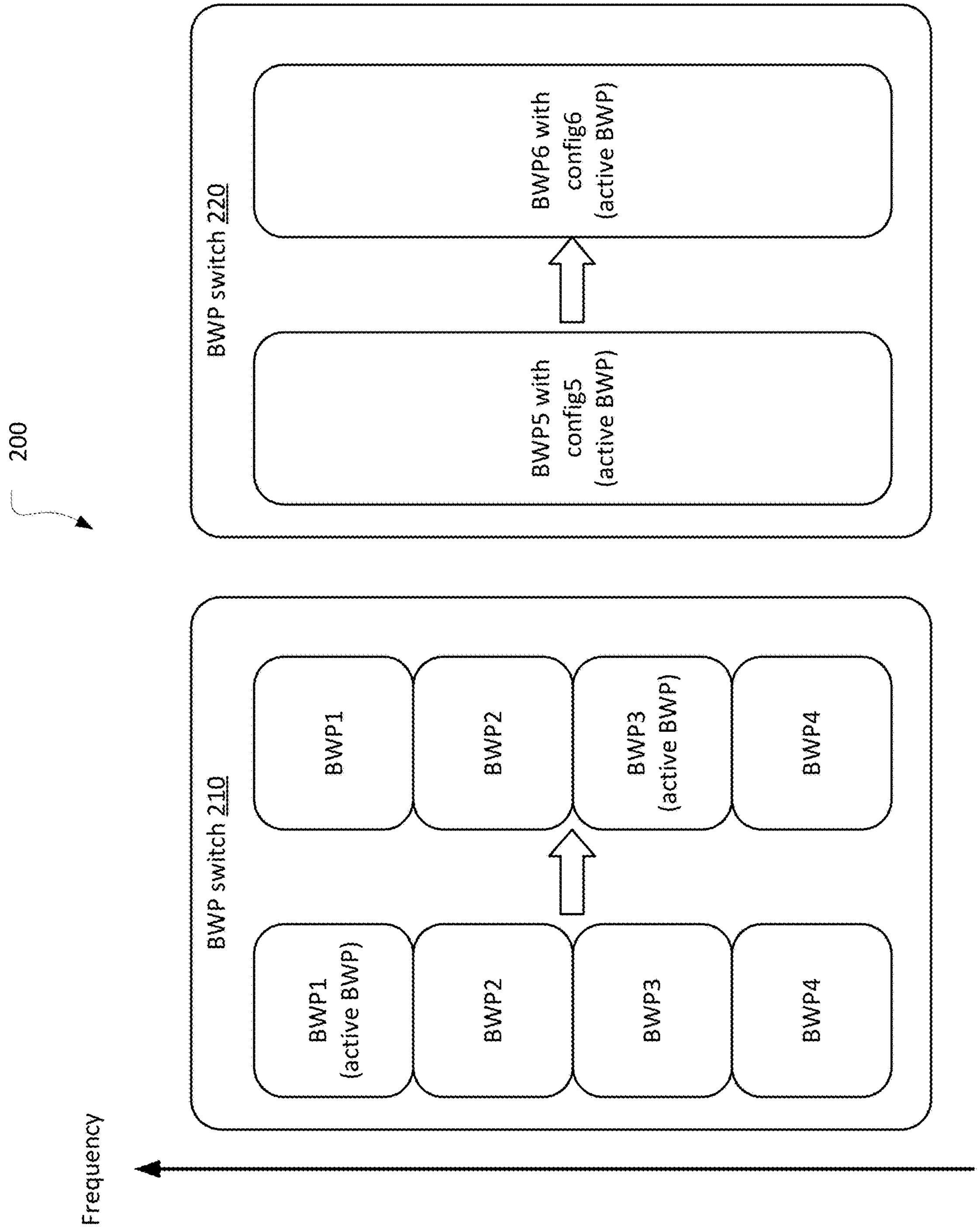
FIG. 2 illustrates aspects of BWP switching in accordance with some embodiments.

FIG. 2 illustrates aspects of BWP switching 200 in accordance with some embodiments. In BWP switch 210, the UE may be configured with four BWPs, e.g., BWP1-4, and BWP1 is configured to be the active BWP. The UE may detect an event that prompts a BWP switch and switch the active BWP from BWP1 to BWP3. In BWP switch 210, the location of the frequency of the active BWP is changed. The BWP switch may also include a change in the bandwidth of the BWP or configurations related to the transmitter or receiver, such as subcarrier spacing or PUCCH or PUSCH configurations.

In BWP switch 220, the UE is configured with a BWP5 that may encompass the entire bandwidth, and config5 is the set of configurations associated with the BWP5. The UE may detect an event that prompts a BWP switch and switch the active BWP from BWP5 to BWP6. In BWP switch 210, the location or bandwidth of the active BWP is not changed, and only configurations such as subcarrier spacing or PUCCH or PUSCH configurations are changed.

Figure 3:
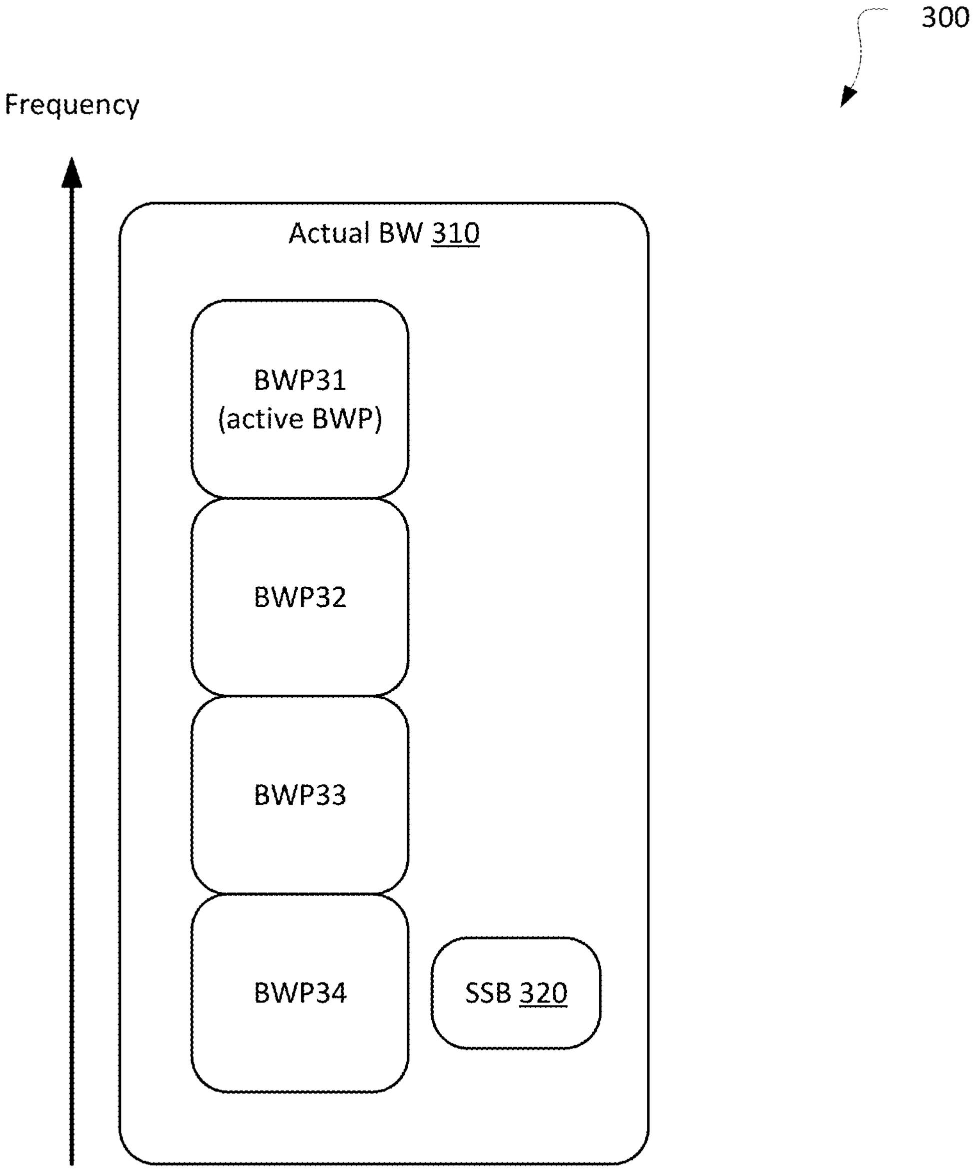
FIG. 3 illustrates a BWP configuration in accordance with some embodiments.

FIG. 3 illustrates a BWP configuration 300 in accordance with some embodiments. In particular, the BWP configuration 300 shows a BWP without restriction. The UE 104 is configured with four BWPs, e.g., BWP31-34. The BWP31 is the active BWP, e.g., the UE 104 sends and receives information on BWP31. The UE 104 is capable of BWP configuration without restriction, e.g., the SSB 320 may be on frequencies outside of the BWP31. The UE 104 may also be capable of BWP without interruption, e.g., the UE 104 may be capable of receiving the entire BW, e.g., an actual BW 310.

The UE 104 may detect an event that prompts to switch the active BWP from one configured BWP to another, e.g., from BWP31 to BWP33. The BS 108 may use semi-persistent signaling, e.g., RRC reconfiguration, to schedule or to indicate switching BWP. The BS 108 may use dynamic signaling, e.g., downlink control information (DCI), to switch the active BWP. For example, the BS 108 may use a BWP switch indicator in DCI format 1_1 and 0_1.

The BS 108 may configure the UE 104 with a BWP inactivity timer. The BS 108 may also configure the UE 104 with a default BWP. The UE 104 may start the BWP inactivity timer when it activates a BWP other than the default BWP. The UE 104 may restart the BWP inactivity timer when it receives a DCI for a transmission associated with the active BWP. Upon the expiry of the inactivity timer, the UE 104 may switch to the default BWP.

FIG. 4 illustrates configuration aspects 400 in accordance with some embodiments. The configuration aspects 400 include table 410 and an example BWP configuration 420.

Table 410 includes the BWP switch delay time for type 1, type 2, and type 3, where type 1-3 may be based on the UE capabilities or the difference between the BWP that the UE 104 switched to and the BWP that the UE 104 switched from. The BS 108 may set the BWP switch delay, e.g., the $T_{BWPswitchDelay}$ parameter, based on the slot length, index, and BWP switch delay type, e.g., type 1-3. In some instances, the index may indicate the subcarrier spacing. The slot length may be expressed in milliseconds (ms), and the BWP switch delay may be expressed in the number of slots. For example, for index=2, slot length of 0.25 ms, and type 1 switching, the BWP switch delay is 3 slots.

In some embodiments, type 3 BWP switch delay may be associated with BWP switching in which both BWPs are without restriction or interruption. For example, switching BWP from a first BWP configuration to a second BWP configuration may be a type 3 switching when the difference between the first and second BWP configuration is only with respect to the location and bandwidth (locationAndBandwidth) parameter.

Type 3 BWP switch delay may be equal to or less than the type 1 or type 2 BWP switch delay. For example, X1 may be equal to or less than 1 slot, X2 may be less than 2 slots, X3 may be less than 3 slots, X4 may be less than 6 slots, X5 may be less than 20 slots, and X6 may be less than 39 slots. In one embodiment, type 3 BWP switching may not have any BWP switch delay, for example, X1=X2=X3=X4=X5=X6=0 ms. In one embodiment, the value of Xi (i=1–6) is the round-up to the number of slots based on 0.25 ms. For example, Xi is the round-up of a ratio of 0.25 ms to the slot length associated with the Xi, e.g., X1=round-up (0.25/1)=1, X2=round-up (0.25/0.5)=1, X3=round-up (0.25/0.25)=1, X4=round-up (0.25/0.125)=2, X5=round-up (0.25/0.03125)=8, and X6=round-up (0.25/0.015625)=16.

The BWP configuration 420 is an example of the BWP configuration information element. The BWP configuration 420 may include a field that determines the location and bandwidth of the BWP, e.g., the locationAndBandwidth field 425. The location may be associated with the frequency domain location of the BWP. For example, the location may be indicated by the first physical resource block (PRB). The bandwidth of the BWP may be defined by the number of allocated PRBs. The BWP configuration 420 may include a parameter that indicates the subcarrier spacing, e.g., subcarrierSpacing. The BWP configuration 420 may include a parameter that indicates the cyclic prefix, e.g., cyclicPrefix.

The locationAndBandwidth field may determine the frequency domain location and bandwidth of the BWP. The value of the field may be interpreted as resource indicator value (RIV) as defined in the 3GPP Technical Specification (TS) 38.214 v. 17.6.0 2023 Jun. 26 with assumptions as described in TS 38.213 v. 17.6.0 2023 Jun. 26, e.g., setting $N^{size}$=275. The first physical resource block (PRB) may be a PRB determined by subcarrierSpacing field of the BWP and offsetToCarrier BWP (configured in SCS-SpecificCarrier contained within FrequencyInfoDL/FrequencyInfoUL/FrequencyInfoUL-SIB/FrequencyInfoDL-SIB within ServingCellConfigCommon/ServingCellConfigCommonSIB) corresponding to this subcarrier spacing. In the case of TDD, a BWP-pair (UL BWP and DL BWP with the same bwp-Id) may have the same center frequency (TS 38.213).

FIG. 5 illustrates configuration aspects 500 in accordance with some embodiments. The configuration aspects 500 include table 510 and a UE capability 520.

Table 510 includes the interruption length Y for type 1 and type 2 and interruption length Z 515 for type 3. The BS 108 may set the interruption length based on the slot length, index, and BWP switch delay type, e.g., type 1-3. In some instances, the index may indicate the subcarrier spacing. The slot length may be expressed in milliseconds (ms), and the interruption length may be expressed in the number of slots. For example, for index=2, slot length of 0.25 ms, and type 1-2 interruption length Y is 3 slots, and type 3 interruption length Z 515 is Z3 slots.

In some embodiments, type 3 switching is associated with BWP without restriction or interruption. For example, switching BWP from a first BWP configuration to a second BWP configuration may be a type 3 switching when the difference between the first and second BWP configuration is only with respect to the location and bandwidth parameter, e.g., changes are restricted to changes to location only, bandwidth only, or both location and bandwidth.

The interruption length Z 515 associated with a type 3 BWP switching can be less than or equal to the corresponding interruption length Y associated with type 1 or 2 BWP switching. For example, Z1 may be equal to or less than 1 slot, Z2 may be equal to or less than 1 slot, Z3 may be equal to or less than 3 slot, Z4 may be equal to or less than 5 slot, Z5 may be equal to or less than 17 slot, and Z6 may be equal to or less than 33 slot. In one embodiment, Z1=Z2=Z3=Z4=Z5=Z6=0 ms. In one embodiment, the value of Zi (i=1-6) is the round-up to the number of slots based on 0.25 ms. For example, Zi is the round-up of a ratio of 0.25 ms to the slot length associated with the Zi, e.g., Z1=round-up (0.25/1)=1, Z2=round-up (0.25/0.5)=1, Z3=round-up (0.25/0.25)=1, Z4=round-up (0.25/0.125)=2, Z5=round-up (0.25/0.03125)=8, and Z6=round-up (0.25/0.015625)=16.

The UE capability 520 is an example of a parameter definition of UE capability related to BWP switching. The UE capability 520 may indicate support for type 3 BWP switching. In one instance, a UE supporting UE capability 520 may be associated with interruption length Z 515. In another instance, the UE capability 520 may include a parameter that indicates the UE support of type 3 BWP switching. For example, the bwp-SwitchingDelay-r19 525 is information that may indicate the type of BWP switching. In one instance, the bwp-SwitchingDelay-r19 525 may have two or more bits. A value of 0 of the bwp-SwitchingDelay-r19 525 may indicate support of type 1 BWP switching, a value of 1 may indicate support of type 2 BWP switching, and a value of 2 may indicate support of type 3 BWP switching.

In one instance, the UE capability 520 associated with the bwp-SwitchingDelay-r19 525 may be a mandatory feature. In another instance, the UE capability 520 associated with the bwp-SwitchingDelay-r19 525 may be optional. In one instance, the UE capability 520 associated with the bwp-SwitchingDelay-r19 525 may be the same for frequency domain duplex (FDD) or time domain duplex (TDD) frame structures. In one instance, the UE capability 520 associated with the bwp-SwitchingDelay-r19 525 may differentiate between FDD or TDD frame structures. In one instance, the UE capability 520 associated with the bwp-SwitchingDelay-r19 525 may be the same for frequency range (FR1) or frequency range 2 (FR2). In one instance, the UE capability 520 associated with the bwp-SwitchingDelay-r19 525 may differentiate between FR1 and FR2.

In one embodiment, the UE may send the UE capability 520 to the BS using capability signaling to indicate support of type 3 BWP switching delay. In one embodiment, the 3GPP specifications may mandate UE to support the UE capability 520 when UE can support BWP without restriction or interruption.

Figure 6:
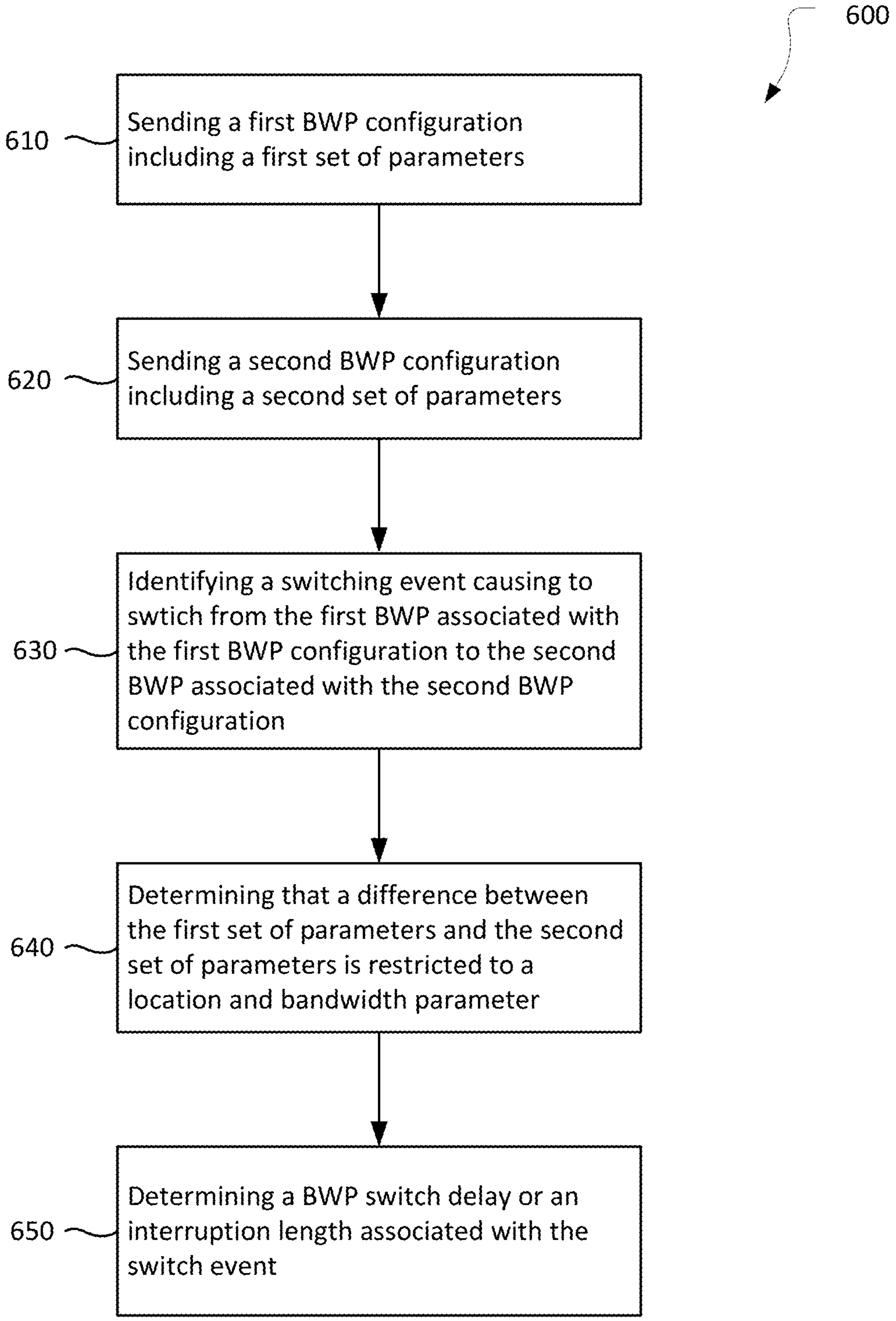
FIG. 6 illustrates an operational flow/algorithmic structure in accordance with some embodiments.

FIG. 6 illustrates an operational flow/algorithmic structure 600 in accordance with some embodiments. Operational flow/algorithmic structure 600 is an example of operating BS instructing a UE to perform a BWP switching of a BWP without restriction or interruption that is restricted to the location and bandwidth of the BWP. The operational flow/algorithmic structure 600 may be implemented by a network node, for example, the AN 108, the network node 1000, or components therein, e.g., processors 1004.

The operational flow/algorithmic structure 600 may include, at 610, sending a first BWP configuration. The first BWP configuration may include a first set of parameters. The BS may receive a UE capability message and configure the first BWP configuration based on the UE capabilities. The BS may configure the UE with BWP without restriction or interruption.

The operational flow/algorithmic structure 600 may include, at 620, sending a second BWP configuration. The second BWP configuration may include a second set of parameters.

The operational flow/algorithmic structure 600 may include 630 identifying a switching event causing the switch from the first BWP associated with the first BWP configuration to the second BWP associated with the second BWP configuration. The switching event may be triggered by the network (e.g., the BS) or the UE.

The operational flow/algorithmic structure 600 may include, at 640, determining that the difference between the first set of parameters and the second set of parameters is restricted to a location and bandwidth parameter.

The operational flow/algorithmic structure 600 may include, at 650, determining a BWP switch delay or an interruption length associated with the switch event. Based on the UE capability and the difference between the first and second BWP configurations, the BS may determine the BWP switch delay and interruption length. The BS may not send any DL transmission to the UE based on the BWP switch delay time or the interruption length. The BS may not expect to receive an UL transmission from the UE based on the BWP switch delay time or the interruption length. The UE may not send an UL transmission to the BS based on the BWP switch delay time or the interruption length. The UE may not expect to receive a DL transmission from the BS based on the BWP switch delay time or the interruption length.

The BWP switch delay time value may be based on compliance with mandated settings or a UE signaling. The value of the BWP switch delay time may be 0 ms. The value of the BWP switch delay time may be a specific value based on a slot length.

The value of the interruption length may be based on compliance with mandated settings or a UE signaling. The value of the interruption length may be 0 ms. The value of the interruption length may be a specific value based on a slot length.

Figure 7:
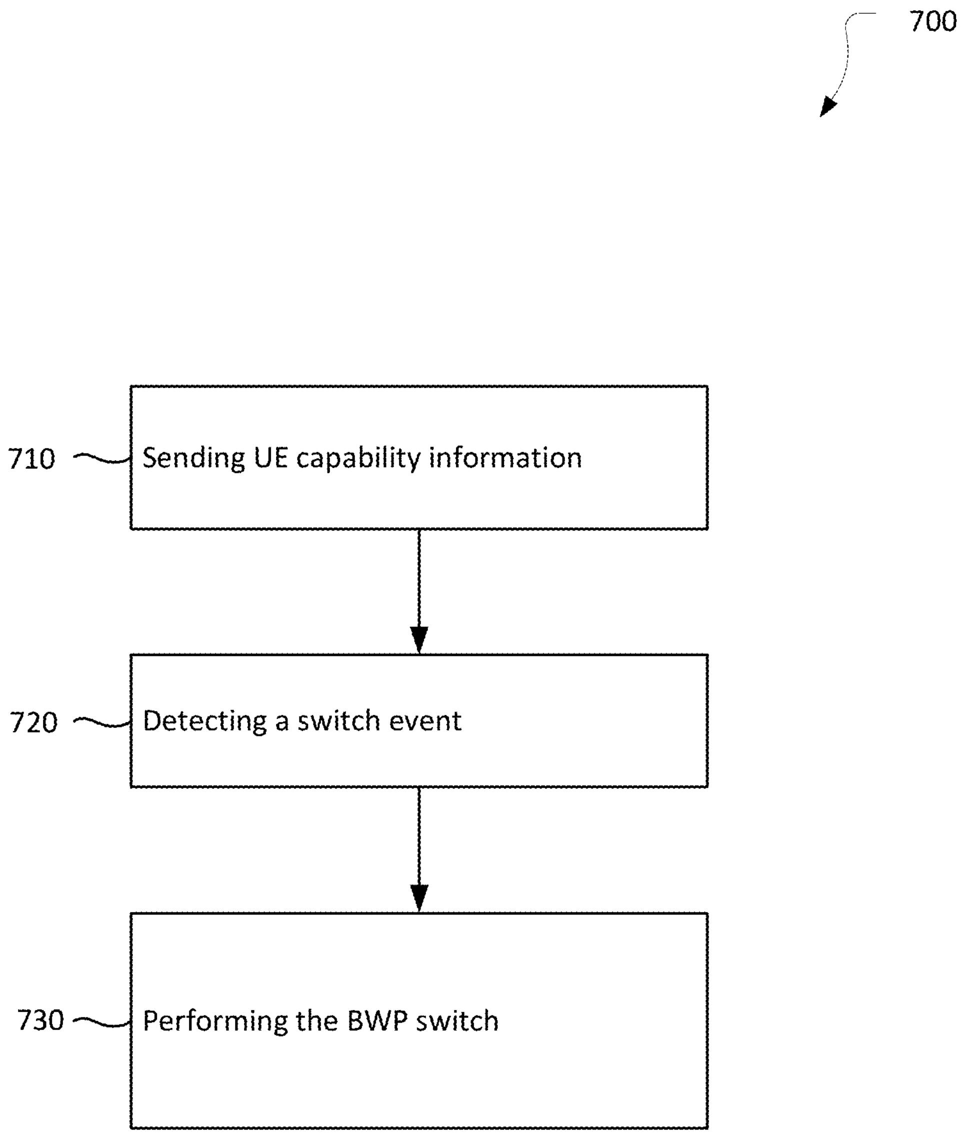
FIG. 7 illustrates an operational flow/algorithmic structure in accordance with some embodiments.

FIG. 7 illustrates an operational flow/algorithmic structure 700 in accordance with some embodiments. Operational flow/algorithmic structure 700 is an example of a UE procedure related to BWP switching without restriction or interruption that is restricted to a location and bandwidth parameter of the BWP. The operation flow/algorithmic structure 900 may be implemented by a UE (for example, UE 104 or UE 900) or components therein, for example, processing circuitry 904.

The operation flow/algorithmic structure 700 may include, at 710, sending UE capability information to the BS. The UE capability information may indicate an ability to perform a BWP switch with a BWP switch delay or an interruption length associated with a type 3 BWP switching delay. The type 3 BWP switching delay may be associated with a switch from a first BWP with a first BWP configuration having a first plurality of parameters to a second BWP with a second BWP configuration having a second plurality of parameters. The difference between the first plurality of parameters and the second plurality of parameters is restricted to a location and bandwidth parameter. The BWP may be without restriction or interruption.

The BWP switch delay or the interruption length associated with the type 3 BWP switching delay may be zero.

The BWP switch delay or the interruption length may be a specific value defined by the 3GPP technical specifications.

The operation flow/algorithmic structure 700 may include, at 720, detecting a switch event. The switch event may be receiving a BWP configuration via semi-static signaling, e.g., RRC reconfiguration signaling, or via dynamic signaling, e.g., DCI, or an indication of BWP switching. The switch event may be an expiration of a timer, e.g., a BWP inactivity timer.

The operation flow/algorithmic structure 700 may include, at 730, performing the BWP switch based on the switch event. The switching duration is equal to or smaller than the BWP switch delay, or the transmission or reception interruption duration is equal to or smaller than the interruption length.

Figure 8:
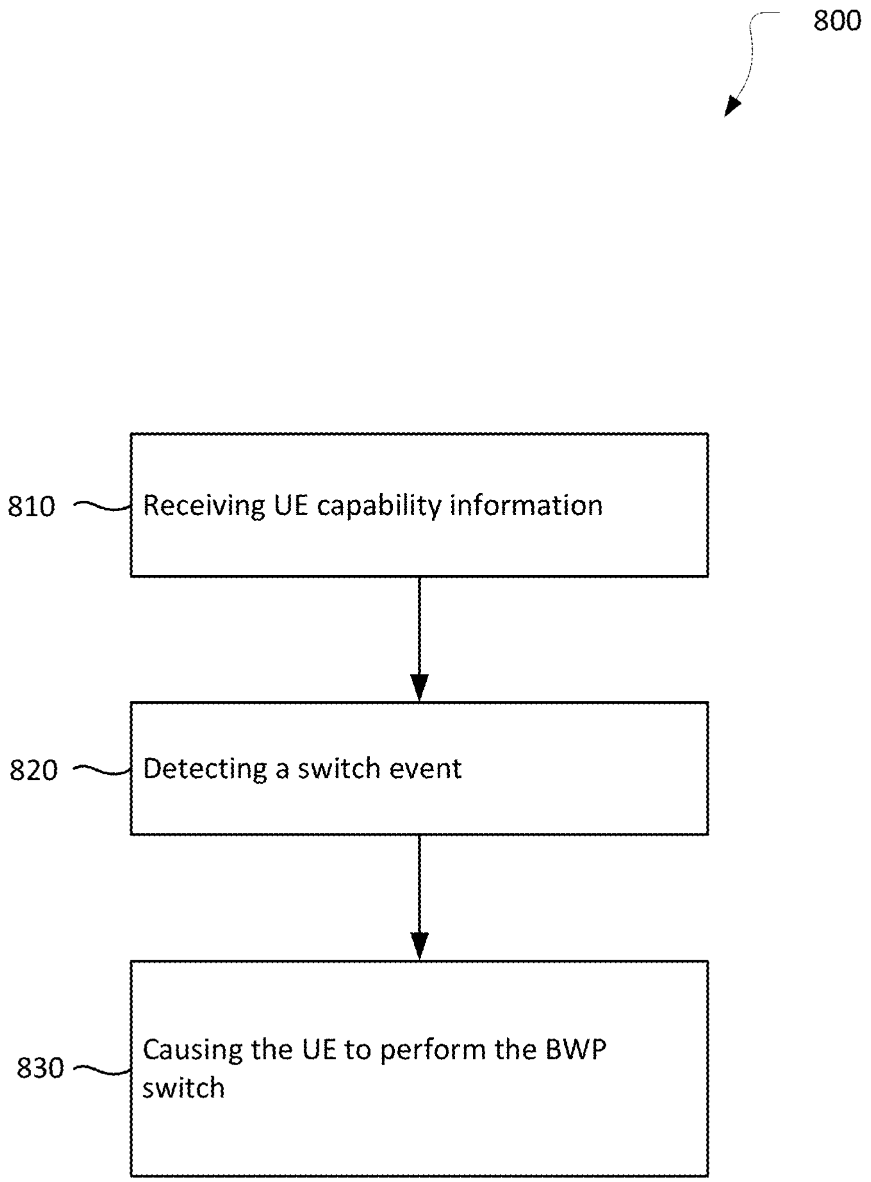
FIG. 8 illustrates an operational flow/algorithmic structure in accordance with some embodiments.

FIG. 8 illustrates an operational flow/algorithmic structure 800 in accordance with some embodiments. Operational flow/algorithmic structure 800 is an example of operating BS procedures related to BWP switching without restriction or interruption that is restricted to the location and bandwidth parameter of the BWP. The operational flow/algorithmic structure 600 may be implemented by a network node, for example, the AN 108, the network node 1000, or components therein, e.g., processors 1004.

The operational flow/algorithmic structure 800 may include, at 810, receiving UE capability information from the UE. The UE capability information may indicate an ability to perform a BWP switch with a BWP switch delay or an interruption length associated with a type 3 BWP switching delay. The type 3 BWP switching delay may be associated with a switch from a first BWP with a first BWP configuration having a first plurality of parameters to a second BWP with a second BWP configuration having a second plurality of parameters. The difference between the first plurality of parameters and the second plurality of parameters is restricted to a location and bandwidth parameter. The BWP may be without restriction or interruption.

The BWP switch delay or the interruption length associated with the type 3 BWP switching delay may be zero.

The BWP switch delay or the interruption length may be a specific value defined by the 3GPP technical specifications.

The operation flow/algorithmic structure 800 may include, at 820, detecting a switch event. The switch event may be receiving a BWP configuration via semi-static signaling, e.g., RRC reconfiguration signaling, or via dynamic signaling, e.g., DCI, or an indication of BWP switching. The switch event may be the expiration of a timer, e.g., a BWP inactivity timer.

The operation flow/algorithmic structure 800 may include, at 830, causing the UE to perform the BWP switch based on the switch event. The switching duration is equal to or smaller than the BWP switch delay, or the transmission or reception interruption duration is equal to or smaller than the interruption length.

Figure 9:
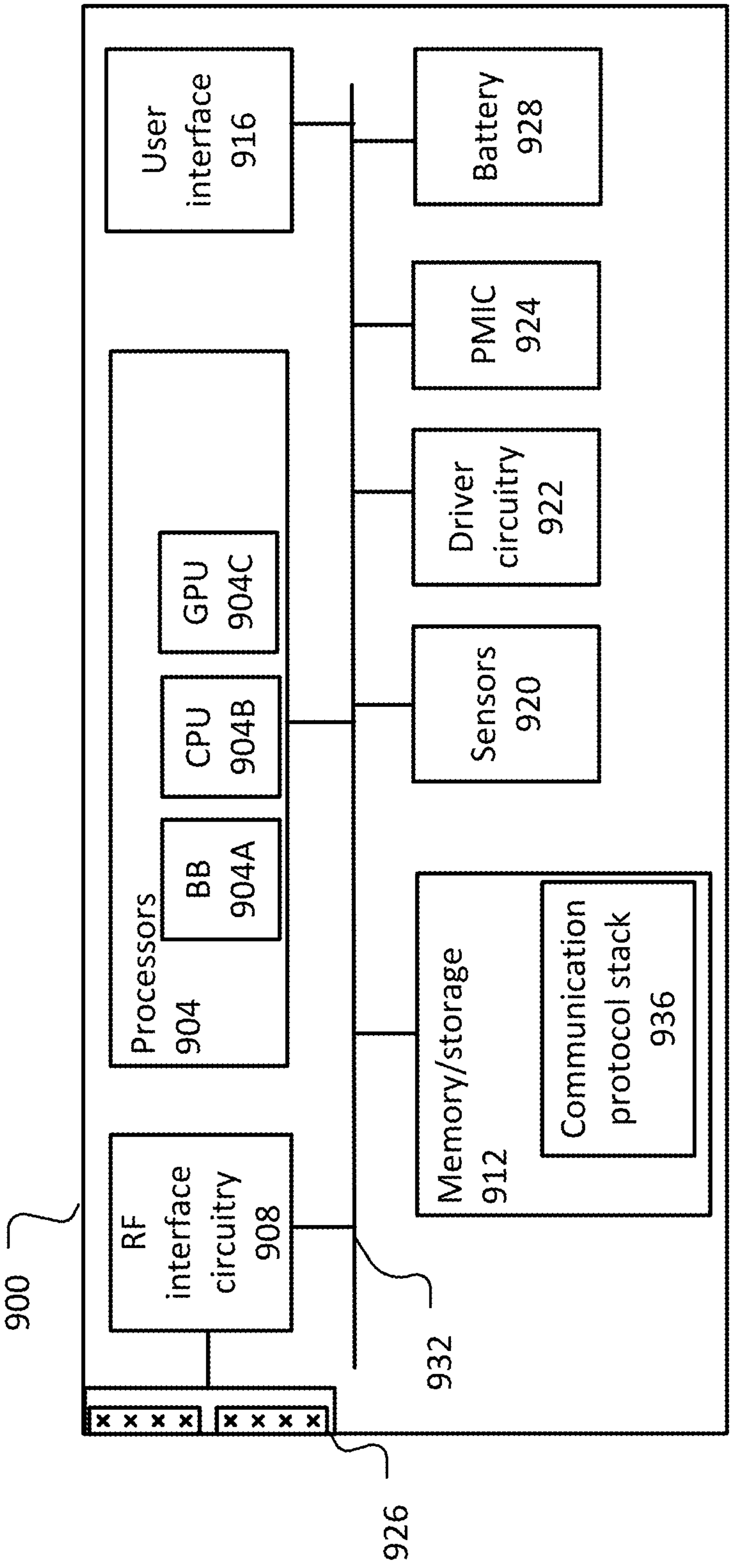
FIG. 9 illustrates a user equipment in accordance with some embodiments.

FIG. 9 illustrates a UE 900 in accordance with some embodiments. The UE 900 may be similar to and substantially interchangeable with UE 104 of FIG. 1.

The UE 900 may be any mobile or non-mobile computing device, such as, for example, a mobile phone, computer, tablet, XR device, glasses, industrial wireless sensor (for example, microphone, carbon dioxide sensor, pressure sensor, humidity sensor, thermometer, motion sensor, accelerometer, laser scanner, fluid level sensor, inventory sensor, electric voltage/current meter, or actuator), video surveillance/monitoring device (for example, camera or video camera), wearable device (for example, a smartwatch), or Internet-of-things device.

The UE 900 may include processors 904, RF interface circuitry 908, memory/storage 912, user interface 916, sensors 920, driver circuitry 922, power management integrated circuit (PMIC) 924, antenna structure 926, and battery 928. The components of the UE 900 may be implemented as integrated circuits (ICs), portions thereof, discrete electronic devices, or other modules, logic, hardware, software, firmware, or a combination thereof. The block diagram of FIG. 9 is intended to show a high-level view of some of the components of the UE 900. However, some of the components shown may be omitted, additional components may be present, and different arrangements of the components shown may occur in other implementations.

The components of the UE 900 may be coupled with various other components over one or more interconnects 932, which may represent any type of interface, input/output, bus (local, system, or expansion), transmission line, trace, or optical connection that allows various circuit components (on common or different chips or chipsets) to interact with one another.

The processors 904 may include processor circuitry such as, for example, baseband processor circuitry (BB) 904A, central processor unit circuitry (CPU) 904B, and graphics processor unit circuitry (GPU) 904C. The processors 904 may include any type of circuitry or processor circuitry that executes or otherwise operates computer-executable instructions, such as program code, software modules, or functional processes from memory/storage 912 to cause the UE 900 to perform operations as described herein.

The processors 904 may perform operations associated with BWP switching consistent with the embodiments described herein.

In some embodiments, the baseband processor circuitry 904A may access a communication protocol stack 936 in the memory/storage 912 to communicate over a 3GPP-compatible network. In general, the baseband processor circuitry 904A may access the communication protocol stack 936 to: perform user plane functions at a PHY layer, MAC layer, RLC sublayer, PDCP sublayer, SDAP sublayer, and upper layer; and perform control plane functions at a PHY layer, MAC layer, RLC sublayer, PDCP sublayer, RRC layer, and a NAS layer. In some embodiments, the PHY layer operations may additionally/alternatively be performed by the components of the RF interface circuitry 908.

The baseband processor circuitry 904A may generate or process baseband signals or waveforms that carry information in 3GPP-compatible networks. In some embodiments, the waveforms for NR may be based on the cyclic prefix OFDM (CP-OFDM) in the uplink or downlink and discrete Fourier transform spread OFDM (DFT-S-OFDM) in the uplink.

The memory/storage 912 may include one or more non-transitory, computer-readable media that includes instructions (for example, the communication protocol stack 936) that may be executed by one or more of the processors 904 to cause the UE 900 to perform various operations described herein. The memory/storage 912 includes any type of volatile or non-volatile memory that may be distributed throughout the UE 900. In some embodiments, some of the memory/storage 912 may be located on the processors 904 themselves (for example, L1 and L2 cache), while other memory/storage 912 is external to the processors 904 but accessible thereto via a memory interface. The memory/storage 912 may include any suitable volatile or non-volatile memory such as, but not limited to, dynamic random access memory (DRAM), static random access memory (SRAM), erasable programmable read-only memory (EPROM), electrically erasable programmable read-only memory (EEPROM), Flash memory, solid-state memory, or any other type of memory device technology.

The RF interface circuitry 908 may include transceiver circuitry and a radio frequency front module (RFEM) that allows the UE 900 to communicate with other devices over a radio access network. The RF interface circuitry 908 may include various elements arranged in transmit or receive paths. These elements may include, for example, switches, mixers, amplifiers, filters, synthesizer circuitry, and control circuitry.

In the receive path, the RFEM may receive a radiated signal from an air interface via antenna structure 926 and proceed to filter and amplify (with a low-noise amplifier) the signal. The signal may be provided to a receiver of the transceiver that down-converts the RF signal into a baseband signal that is provided to the baseband processor of the processor 904.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 926.

In various embodiments, the RF interface circuitry 908 may be configured to transmit/receive signals in a manner compatible with NR access technologies.

The antenna 926 may include antenna elements to convert electrical signals into radio waves to travel through the air and to convert received radio waves into electrical signals. The antenna elements may be arranged into one or more antenna panels. The antenna 926 may have antenna panels that are omnidirectional, directional, or a combination thereof to enable beamforming and multiple input, multiple output communications. The antenna 926 may include microstrip antennas, printed antennas fabricated on the surface of one or more printed circuit boards, patch antennas, or phased array antennas. The antenna 926 may have one or more panels designed for specific frequency bands, including bands in FR1 or FR2.

The user interface circuitry 916 includes various input/output (I/O) devices designed to enable user interaction with the UE 900. The user interface 916 includes input device circuitry and output device circuitry. Input device circuitry includes any physical or virtual means for accepting an input, including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual displays, including, inter alia, one or more simple visual outputs/indicators (for example, binary status indicators such as light emitting diodes (LEDs) and multi-character visual outputs, or more complex outputs such as display devices or touchscreens (for example, liquid crystal displays (LCDs), LED displays, quantum dot displays, and projectors), with the output of characters, graphics, multimedia objects, and the like being generated or produced from the operation of the UE 900.

The sensors 920 may include devices, modules, or subsystems whose purpose is to detect events or changes in its environment and send the information (sensor data) about the detected events to some other device, module, or subsystem. Examples of such sensors include inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; and microphones or other like audio capture devices.

The driver circuitry 922 may include software and hardware elements that operate to control particular devices that are embedded in the UE 900, attached to the UE 900, or otherwise communicatively coupled with the UE 900. The driver circuitry 922 may include individual drivers allowing other components to interact with or control various I/O devices that may be present within or connected to the UE 900. For example, the driver circuitry 922 may include circuitry to facilitate the coupling of a universal integrated circuit card (UICC) or a universal subscriber identity module (USIM) to the UE 900. For additional examples, driver circuitry 922 may include a display driver to control and allow access to a display device, a touchscreen driver to control and allow access to a touchscreen interface, sensor drivers to obtain sensor readings of sensor circuitry 920 and control and allow access to sensor circuitry 920, drivers to obtain actuator positions of electro-mechanic components or control and allow access to the electro-mechanic components, a camera driver to control and allow access to an embedded image capture device, audio drivers to control and allow access to one or more audio devices.

The PMIC 924 may manage the power provided to various components of the UE 900. In particular, with respect to the processors 904, the PMIC 924 may control power-source selection, voltage scaling, battery charging, or DC-to-DC conversion.

In some embodiments, the PMIC 924 may control or otherwise be part of various power-saving mechanisms of the UE 900, including DRX, as discussed herein.

A battery 928 may power the UE 900, although in some examples, the UE 900 may be mounted and deployed in a fixed location and may have a power supply coupled to an electrical grid. The battery 928 may be a lithium-ion battery, a metal-air battery, such as a zinc-air battery, an aluminum-air battery, a lithium-air battery, and the like. In some implementations, such as in vehicle-based applications, the battery 928 may be a typical lead-acid automotive battery.

Figure 10:
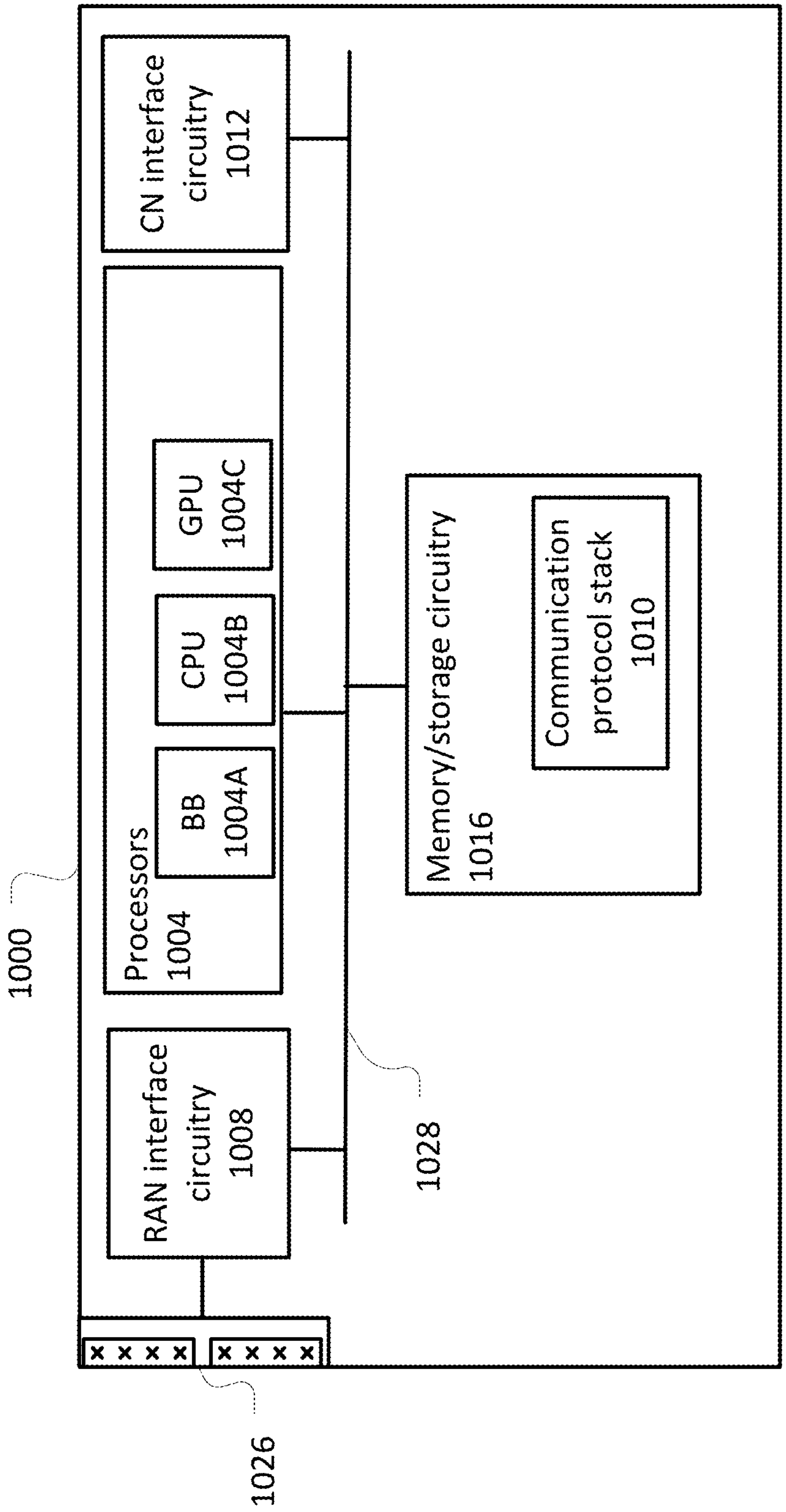
FIG. 10 illustrates a network node in accordance with some embodiments.

FIG. 10 illustrates a network node 1000 in accordance with some embodiments. The network node 1000 may be similar to and substantially interchangeable with base station 108, a device implementing one of the network hops, an integrated access and backhaul (IAB) node, a network-controlled repeater, or a server in a core network or external data network.

The network node 1000 may include processors 1004, RF interface circuitry 1008 (if implemented as an access node), the core node (CN) interface circuitry 1012, memory/storage circuitry 1016, and antenna structure 1026.

The components of the network node 1000 may be coupled with various other components over one or more interconnects 1028.

The processors 1004, RF interface circuitry 1008, memory/storage circuitry 1016 (including communication protocol stack 1010), antenna structure 1026, and interconnects 1028 may be similar to like-named elements shown and described with respect to FIG. 9.

The processors 1004 may perform operations associated with BWP switching consistent with embodiments described herein.

The CN interface circuitry 1012 may provide connectivity to a core network, for example, a 5th Generation Core network (5GC) using a 5GC-compatible network interface protocol such as carrier Ethernet protocols or some other suitable protocol. Network connectivity may be provided to/from the network node 1000 via a fiber optic or wireless backhaul. The CN interface circuitry 1012 may include one or more dedicated processors or FPGAs to communicate using one or more of the aforementioned protocols. In some implementations, the CN interface circuitry 1012 may include multiple controllers to provide connectivity to other networks using the same or different protocols.

In some embodiments, the network node 1000 may be coupled with transmit-receive points (TRPs) using the antenna structure 1026, CN interface circuitry, or other interface circuitry.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more aspects, at least one of the components set forth in one or more of the preceding figures may be configured to perform one or more operations, techniques, processes, or methods as set forth in the example section below. For example, the baseband circuitry, as described above in connection with one or more of the preceding figures, may be configured to operate in accordance with one or more of the examples set forth below. For another example, circuitry associated with a UE, base station, network element, etc., as described above in connection with one or more of the preceding figures, may be configured to operate in accordance with one or more of the examples set forth below in the example section.

Examples

In the following sections, further exemplary aspects are provided.

Example 1 includes a method for operating a base station (BS), the method comprising: sending, to a user equipment (UE), a first bandwidth part (BWP) configuration having a first plurality of parameters; sending, to the UE, a second BWP configuration having a second plurality of parameters; identifying a switch event in which the UE switches from a first BWP associated with the first BWP configuration to a second BWP associated with the second BWP configuration; determining a difference between the first plurality of parameters and the second plurality of parameters is restricted to a location and bandwidth parameter; and determining, based on said determining the difference between the first plurality of parameters and the second plurality of parameters is restricted to a location and bandwidth parameter, a BWP switch delay or an interruption length associated with the switch event.

Example 2 includes the method of example 1 or some other examples herein, further comprising: determining a UE capability, wherein said determining the BWP switch delay or the interruption length associated with the switch event is based on the UE capability.

Example 3 includes the method of examples 1 or 2 or some other examples herein, wherein said determining the UE capability is based on compliance with mandated setting or a UE signaling.

Example 4 includes the method of any of examples 1-3 or some other examples herein, wherein determining the BWP switch delay or the interruption length comprises determining the BWP switch delay is zero.

Example 5 includes the method of any of examples 1~4 or some other examples herein, wherein determining the BWP switch delay or the interruption length comprises determining the BWP switch delay based on a slot length.

Example 6 includes the method of any of examples 1-5 or some other examples herein, wherein: the slot length is 0.5 milliseconds (ms) and the BWP switch delay is one slot, the slot length is 0.25 ms and the BWP switch delay is one slot, the slot length is 0.125 ms and the BWP switch delay is two slots, the slot length is 0.03125 ms and the BWP switch delay is eight slots, or the slot length is 0.015625 ms and the BWP switch delay is sixteen slots.

Example 7 includes the method of any of examples 1-6 or some other examples herein, wherein determining the BWP switch delay or the interruption length comprises determining the interruption length is zero.

Example 8 includes the method of any of examples 1-7 or some other examples herein, wherein determining the BWP switch delay or the interruption length comprises determining the interruption length value based on a slot length.

Example 9 includes the method of any of examples 1-8 or some other examples herein, wherein: the slot length is 0.25 ms and the interruption length is one slot, the slot length is 0.125 ms and the interruption length is two slots, the slot length is 0.03125 ms and the interruption length is eight slots, or the slot length is 0.015625 ms and the interruption length is sixteen slots.

Example 10 includes a method for operating a user equipment (UE), the method comprising: sending, to a base station (BS), UE capability information to indicate an ability to perform a bandwidth part (BWP) switch with a BWP switch delay or an interruption length associated with a type 3 BWP switching delay, wherein the type 3 BWP switching delay is associated with a switch from a first BWP with a first BWP configuration having a first plurality of parameters to a second BWP with a second BWP configuration having a second plurality of parameters, where a difference between the first plurality of parameters and the second plurality of parameters is restricted to a location and bandwidth parameter; detecting a switch event; and performing, based on the switch event, the BWP switch.

Example 11 includes the method of example 10 or some other examples herein, further comprising determining the BWP switch delay associated with the type 3 BWP switching delay is zero.

Example 12 includes the method of examples 10 or 11 or some other examples herein, further comprising determining the BWP switch delay associated with the type 3 BWP switching delay based on a slot length.

Example 13 includes the method of any of examples 10-12 or some other examples herein, wherein: the slot length is 0.5 milliseconds (ms) and the BWP switch delay is one slot, the slot length is 0.25 ms and the BWP switch delay is one slot, the slot length is 0.125 ms and the BWP switch delay is two slots, the slot length is 0.03125 ms and the BWP switch delay is eight slots, or the slot length is 0.015625 ms and the BWP switch delay is sixteen slots.

Example 14 includes the method of any of examples 10-13 or some other examples herein, further comprising determining the interrupt length associated with the type 3 BWP switching delay is zero.

Example 15 includes the method of any of examples 10-14 or some other examples herein, further comprising determining the interrupt length associated with the type 3 BWP switching delay based on a slot length.

Example 16 includes the method of any of examples 10-15 or some other examples herein, wherein: the slot length is 0.25 ms and the interruption length is one slot, the slot length is 0.125 ms and the interruption length is two slots, the slot length is 0.03125 ms and the interruption length is eight slots, or the slot length is 0.015625 ms and the interruption length is sixteen slots.

Example 17 includes a method for operating a base station (BA), the method comprising: receiving, from a user equipment (UE), UE capability information to indicate an ability to perform a bandwidth part (BWP) switch with a BWP switch delay or an interruption length associated with a type 3 BWP switching delay, wherein the type 3 BWP switching delay is associated with a switch from a first BWP with a first BWP configuration having a first plurality of parameters to a second BWP with a second BWP configuration having a second plurality of parameters, where a difference between the first plurality of parameters and the second plurality of parameters is restricted to a location and bandwidth parameter; detecting a switch event; and causing the UE to perform the BWP switch based on the switch event.

Example 18 includes the method of example 17 or some other examples herein, further comprising determining the BWP switch delay associated with the type 3 BWP switching delay is zero.

Example 19 includes the method of examples 17 or 18 or some other examples herein, further comprising determining the BWP switch delay associated with the type 3 BWP switching delay based on a slot length.

Example 20 includes the method of any of examples 17-19 or some other examples herein, wherein: the slot length is 0.5 milliseconds (ms) and the BWP switch delay is one slot, the slot length is 0.25 ms and the BWP switch delay is one slot, the slot length is 0.125 ms and the BWP switch delay is two slots, the slot length is 0.03125 ms and the BWP switch delay is eight slots, or the slot length is 0.015625 ms and the BWP switch delay is sixteen slots.

Example 21 includes the method of any of examples 17-20 or some other examples herein, further comprising determining the interrupt length associated with the type 3 BWP switching delay is zero.

Example 22 includes the method of any of examples 17-21 or some other examples herein, further comprising determining the interrupt length associated with the type 3 BWP switching delay based on a slot length.

Example 23 includes the method of any of examples 17-22 or some other examples herein, wherein: the slot length is 0.25 ms and the interruption length is one slot, the slot length is 0.125 ms and the interruption length is two slots, the slot length is 0.03125 ms and the interruption length is eight slots, or the slot length is 0.015625 ms and the interruption length is sixteen slots.

Another example may include an apparatus comprising logic, modules, or circuitry to perform one or more elements of a method described in or related to any of examples 1-23, or any other method or process described herein.

Another example may include a method, technique, or process as described in or related to any of examples 1-23, or portions or parts thereof.

Another example may include an apparatus comprising: one or more processors and one or more computer-readable media comprising instructions that, when executed by the one or more processors, cause the one or more processors to perform the method, techniques, or process as described in or related to any of examples 1-23, or portions thereof.

Another example includes a signal as described in or related to any of examples 1-23, or portions or parts thereof.

Another example may include a datagram, information element, packet, frame, segment, PDU, or message as described in or related to any of examples 1-23, or portions or parts thereof, or otherwise described in the present disclosure.

Another example may include a signal encoded with data as described in or related to any of examples 1-23, or portions or parts thereof, or otherwise described in the present disclosure.

Another example may include a signal encoded with a datagram, IE, packet, frame, segment, PDU, or message as described in or related to any of examples 1-23, or portions or parts thereof, or otherwise described in the present disclosure.

Another example may include an electromagnetic signal carrying computer-readable instructions, wherein execution of the computer-readable instructions by one or more processors is to cause the one or more processors to perform the method, techniques, or process as described in or related to any of examples 1-23, or portions thereof.

Another example may include a computer program comprising instructions, wherein execution of the program by a processing element is to cause the processing element to carry out the method, techniques, or process as described in or related to any of examples 1-23, or portions thereof.

Another example may include a signal in a wireless network as shown and described herein.

Another example may include a method of communicating in a wireless network as shown and described herein.

Another example may include a system for providing wireless communication as shown and described herein.

Another example may include a device for providing wireless communication as shown and described herein.

Any of the above-described examples may be combined with any other example (or combination of examples), unless explicitly stated otherwise. The foregoing description of one or more implementations provides illustration and description but is not intended to be exhaustive or to limit the scope of aspects to the precise form disclosed. Modifications and variations are possible in light of the above teachings or may be acquired from the practice of various aspects.

Although the aspects above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:

generating, for transmission to a user equipment (UE), a first bandwidth part (BWP) configuration having a first plurality of parameters;

generating, for transmission to the UE, a second BWP configuration having a second plurality of parameters;

identifying a switch event in which the UE switches from a first BWP associated with the first BWP configuration to a second BWP associated with the second BWP configuration;

determining a difference between the first plurality of parameters and the second plurality of parameters is restricted to a location and bandwidth parameter; and determining, based on said determining the difference between the first plurality of parameters and the second plurality of parameters is restricted to a location and bandwidth parameter, a BWP switch delay or an interruption length associated with the switch event.

2. The method of claim 1, further comprising:

determining a UE capability, wherein said determining the BWP switch delay or the interruption length associated with the switch event is based on the UE capability.

3. The method of claim 2, wherein said determining the UE capability is based on compliance with mandated setting or a UE signaling.

4. The method of claim 1, wherein determining the BWP switch delay or the interruption length comprises determining the BWP switch delay is zero.

5. The method of claim 1, wherein determining the BWP switch delay or the interruption length comprises determining the BWP switch delay based on a slot length.

6. The method of claim 1, wherein determining the BWP switch delay or the interruption length comprises determining the interruption length is zero.

7. The method of claim 1, wherein determining the BWP switch delay or the interruption length comprises determining the interruption length based on a slot length.

8. The method of claim 7, wherein: the slot length is 0.25 ms and the interruption length is one slot, the slot length is 0.125 ms and the interruption length is two slots, the slot length is 0.03125 ms and the interruption length is eight slots, or the slot length is 0.015625 ms and the interruption length is sixteen slots.

9. An apparatus comprising:

processing circuitry to:

generate, for transmission to a base station (BS), UE capability information to indicate an ability to perform a bandwidth part (BWP) switch with a BWP switch delay or an interruption length associated with a type 3 BWP switching delay, wherein the type 3 BWP switching delay is associated with a switch from a first BWP with a first BWP configuration having a first plurality of parameters to a second BWP with a second BWP configuration having a second plurality of parameters, where a difference between the first plurality of parameters and the second plurality of parameters is restricted to a location and bandwidth parameter;

detect a switch event; and perform, based on the switch event, the BWP switch; and interface circuitry coupled with the processing circuitry, the interface circuitry to communicatively couple the processing circuitry with a component.

10. The apparatus of claim 9, wherein the processing circuitry is further to:

determine the BWP switch delay associated with the type 3 BWP switching delay is zero.

11. The apparatus of claim 9, wherein the processing circuitry is further to:

determine the BWP switch delay associated with the type 3 BWP switching delay based on a slot length.

12. The apparatus of claim 9, wherein the processing circuitry is further to:

determine the interruption length associated with the type 3 BWP switching delay is zero.

13. The apparatus of claim 9, wherein the processing circuitry further to:

determine the interruption length associated with the type 3 BWP switching delay based on a slot length.

14. The apparatus of claim 13, wherein: the slot length is 0.25 ms and the interruption length is one slot, the slot length is 0.125 ms and the interruption length is two slots, the slot length is 0.03125 ms and the interruption length is eight slots, or the slot length is 0.015625 ms and the interruption length is sixteen slots.

15. One or more non-transitory computer-readable media having instructions that are to be executed to cause a processing circuitry to:

process user equipment (UE) capability information received from a UE, the UE capability information is to indicate an ability to perform a bandwidth part (BWP) switch with a BWP switch delay or an interruption length associated with a type 3 BWP switching delay, wherein the type 3 BWP switching delay is associated with a switch from a first BWP with a first BWP configuration having a first plurality of parameters to a second BWP with a second BWP configuration having a second plurality of parameters, where a difference between the first plurality of parameters and the second plurality of parameters is restricted to a location and bandwidth parameter;

detect a switch event; and cause the UE to perform the BWP switch based on the switch event.

16. The one or more non-transitory computer-readable media of claim 15, wherein the instructions are to be executed to further cause the processing circuitry to:

determine the BWP switch delay associated with the type 3 BWP switching delay is zero.

17. The one or more non-transitory computer-readable media of claim 15, wherein the instructions are to be executed to further cause the processing circuitry to:

determine the BWP switch delay associated with the type 3 BWP switching delay based on a slot length.

18. The one or more non-transitory computer-readable media of claim 17, wherein: the slot length is 0.5 milliseconds (ms) and the BWP switch delay is one slot, the slot length is 0.25 ms and the BWP switch delay is one slot, the slot length is 0.125 ms and the BWP switch delay is two slots, the slot length is 0.03125 ms and the BWP switch delay is eight slots, or the slot length is 0.015625 ms and the BWP switch delay is sixteen slots.

19. The one or more non-transitory computer-readable media of claim 15, wherein the instructions are to be executed to further cause the processing circuitry to:

determine the interruption length associated with the type 3 BWP switching delay is zero.

20. The one or more non-transitory computer-readable media of claim 15, wherein the instructions are to be executed to further cause the processing circuitry to:

determine the interruption length associated with the type 3 BWP switching delay based on a slot length.

* * * * *